United States Patent [19]
Life

[11] Patent Number: 5,845,670
[45] Date of Patent: Dec. 8, 1998

[54] DIVERTER VALVE WITH VACUUM BREAKER

[75] Inventor: James W. Life, Mission Viejo, Calif.

[73] Assignee: Perani, Inc., Agoura Hills, Calif.

[21] Appl. No.: 607,339

[22] Filed: Feb. 26, 1996

[51] Int. Cl.⁶ ................................................. F16K 11/044
[52] U.S. Cl. ..................................... 137/119.05; 137/270
[58] Field of Search .......................... 137/119.03, 119.04, 137/119.05, 270

[56] References Cited

U.S. PATENT DOCUMENTS

| | | | |
|---|---|---|---|
| 3,297,046 | 1/1967 | Hall | 137/119.05 |
| 4,606,370 | 8/1986 | Geipel et al. | 137/119.05 |
| 4,874,006 | 10/1989 | Igbal | 137/119.05 |
| 4,971,099 | 11/1990 | Cyvas | 137/270 |
| 4,979,530 | 12/1990 | Breda | 137/270 |

*Primary Examiner*—Stephen M. Hepperle
*Attorney, Agent, or Firm*—Harry G. Weissenberger

[57] ABSTRACT

A diverter valve for Roman tubs also serves as a vacuum breaker. The valve disc which diverts the water flow to the shower head is spring-loaded to close the shower head line if the pressure at the water inlet drops below a predetermined minimum.

1 Claim, 6 Drawing Sheets

5,845,670

DIVERTER VALVE WITH VACUUM BREAKER

BACKGROUND OF THE INVENTION

Roman tubs conventionally use deck-mounted (as opposed to wall-mounted) plumbing for controlling the water flow. Typically, one or more faucets are provided for providing and mixing hot and cold water as desired, and a diverter is used to direct the water flow either to a spigot which discharges water at a level above the maximum water level of the tub, or to a hand-held movable shower head.

Most building codes require that any water-carrying plumbing which does not discharge into air be equipped with vacuum breakers to prevent water from flowing back into the water line once it has been dispensed, if by some chance a negative pressure should occur in the water line. The main spigot of the Roman tub does, of course, discharge into air, but the hand-held shower head could be placed in the tub under the water level and could therefore be subject to siphoning.

Because of this possibility, the installation of a vacuum breaker upstream of the tub has heretofore been mandatory. However, the vacuum breaker is an additional plumbing element and results in additional equipment cost and installation labor, and may either cause maintenance problems when it is installed out of sight in a relatively inaccessible location, or be unsightly or awkward if installed in a serviceable location when the building code so requires.

SUMMARY OF THE INVENTION

The present invention solves the above-identified problems by combining the vacuum breaker function with the diverting function in the diverter. The diverter can be conducted as a single unit, and is readily accessible for maintenance from the deck of the tub.

The vacuum breaker function is achieved by so constructing the diverter that a substantial back pressure must exist in a downwardly facing outflow tube, to which the shower head is connected, to overcome the closing bias of the diverter. The diverter is biased to close the shower head outflow and instead connect the water line to the air-discharging main spigot, by a combinbation of weight and spring pressure well before any siphoning can occur.

In another aspect of the invention, the flow path of the water through the diverter is so designed that an improper installation of the diverter unit may reduce the efficiency of the diverter but will not cause it to malfunction.

BRIEF DESCRIPTION OF THE DRAWINGS

In FIG. 1, 10 designates a Roman tub in which the invention is used. The tub 10 is surrounded by a generally horizontal deck 12 in which hot and cold water faucets 14, 16, a main spigot 18, a diverter 20, and a hand-held shower head 22 are vertically mounted. The spigot 18 is positioned above the deck 12 so that its spout 24 is always above the maximum water level in the tub 10. The shower head 22 is provided with an extendable hose 26, which is normally retracted into the deck 12 but can be pulled out in order to use the shower head 22. When the hose 26 is pulled out, the shower head 22 can be moved over a wide range, including into the water in the tub 10.

Figure 1:
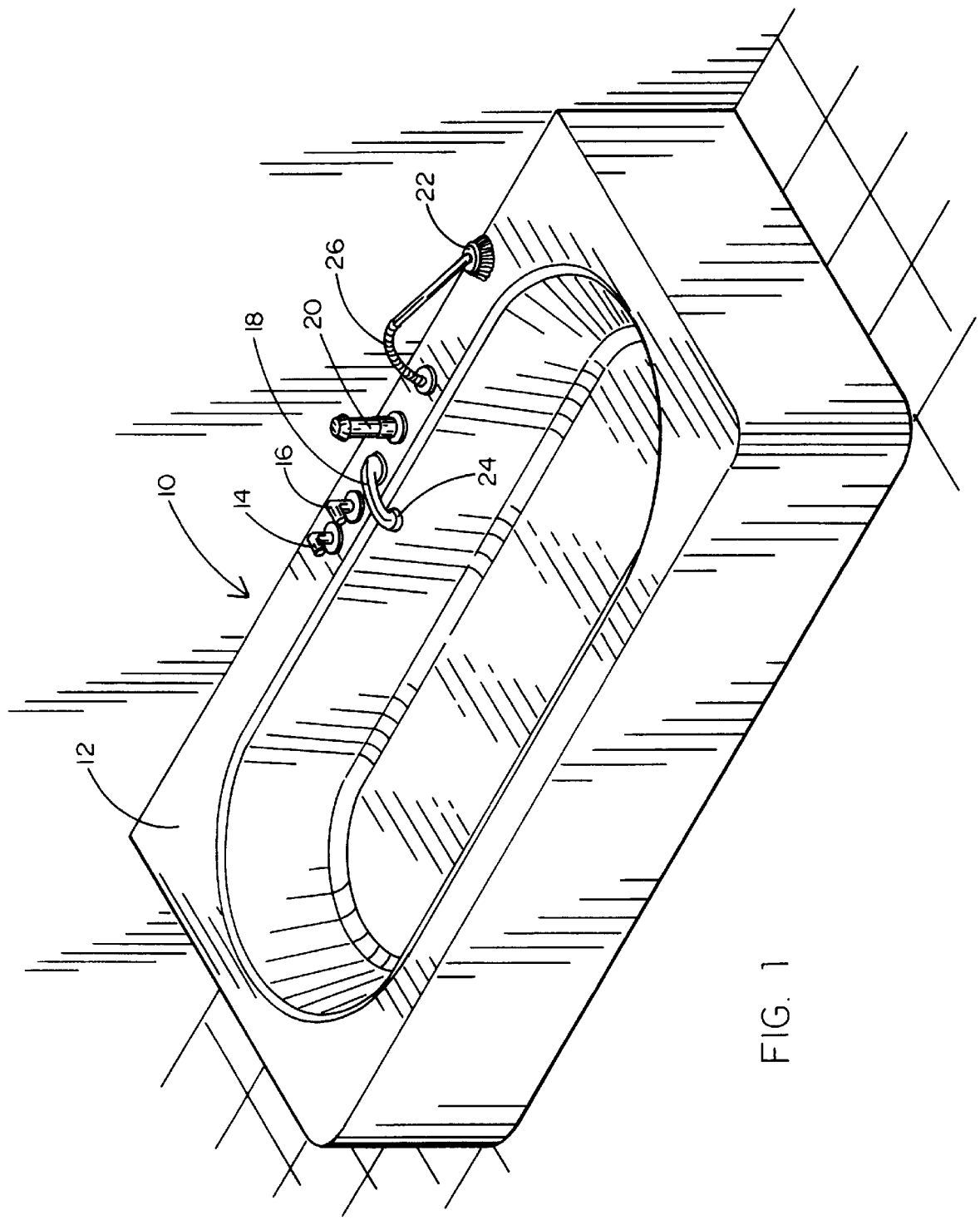
FIG. 1 is a perspective view of a Roman tub incorporating the inventive diverter.
Figure 2:
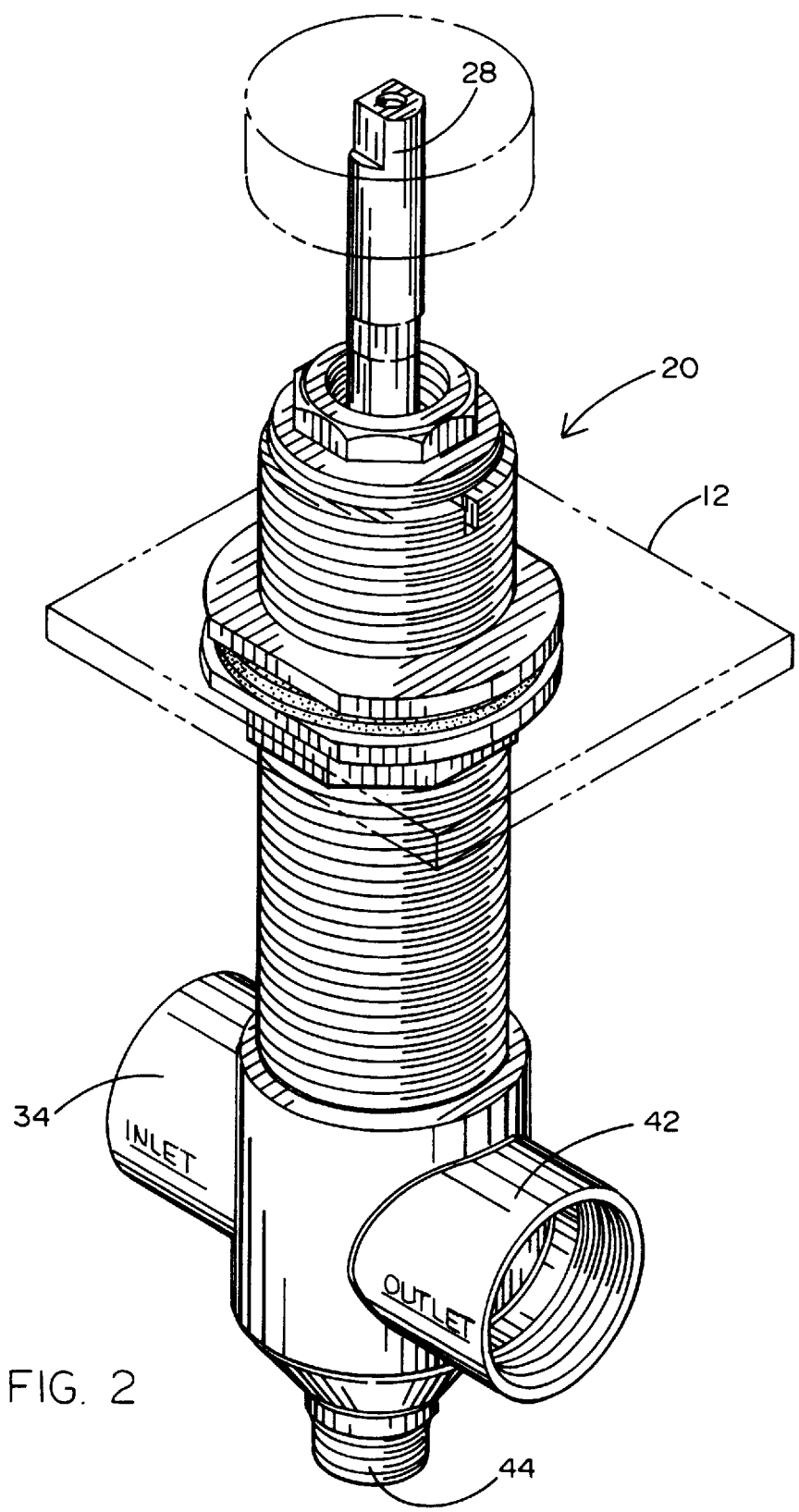
FIG. 2 is a perspective view of the diverter unit.

The diverter 20 switches the water flow between the spigot 18 and the shower head 22. In the down position of the handle 28 (FIG. 2), water from the faucets 14, 16 flows to the spigot 18. When the handle 28 is pulled up, the water flow switches from the spigot 18 to the shower head 22. Because the shower head 22 can be placed under water, it is necessary under most plumbing codes to provide a vacuum breaker to prevent tub water from being siphoned back into the water line if a vacuum or suction condition should by some chance occur in the water supply.

Figure 3:
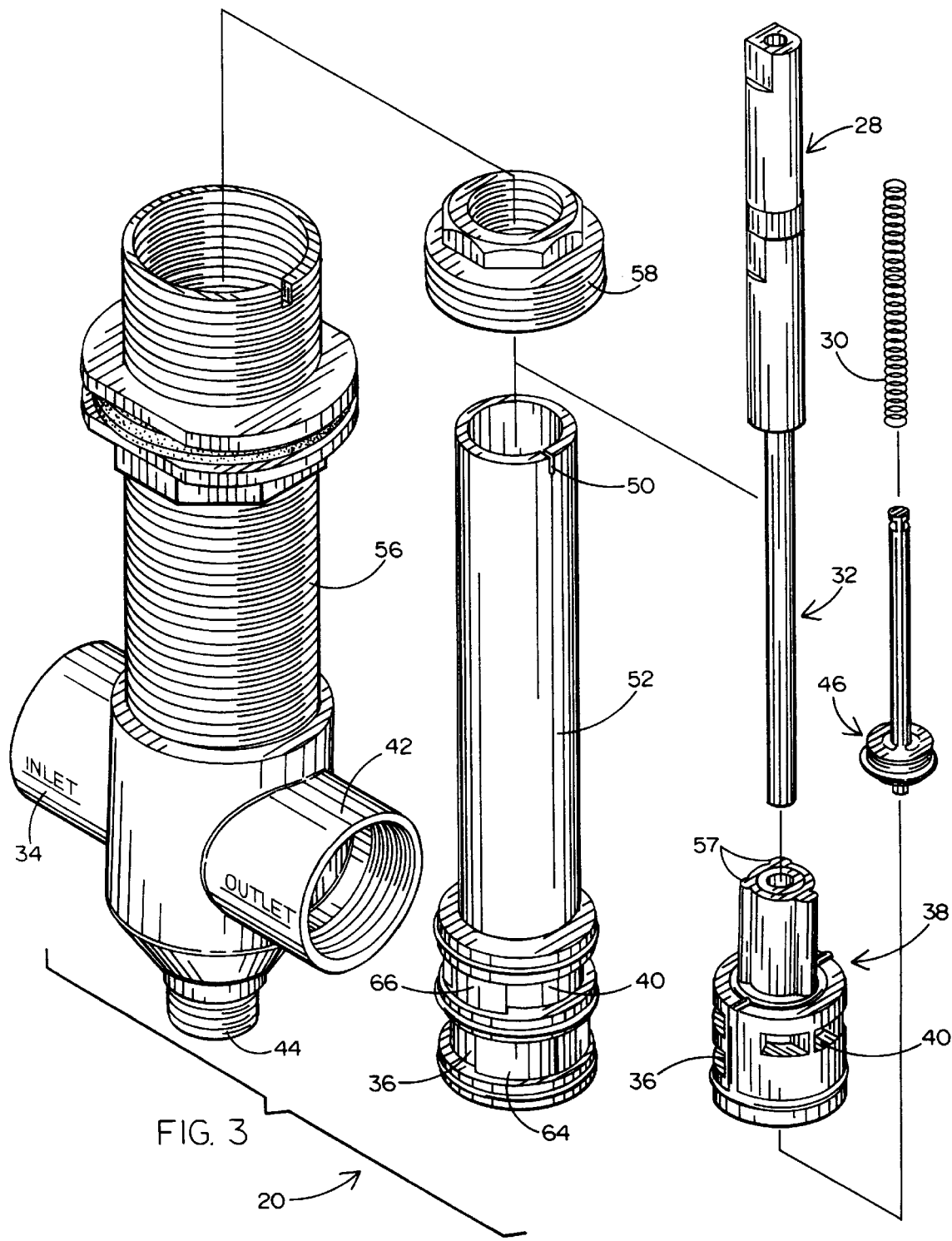
FIG. 3 is an exploded view of the diverter unit.
Figure 4:
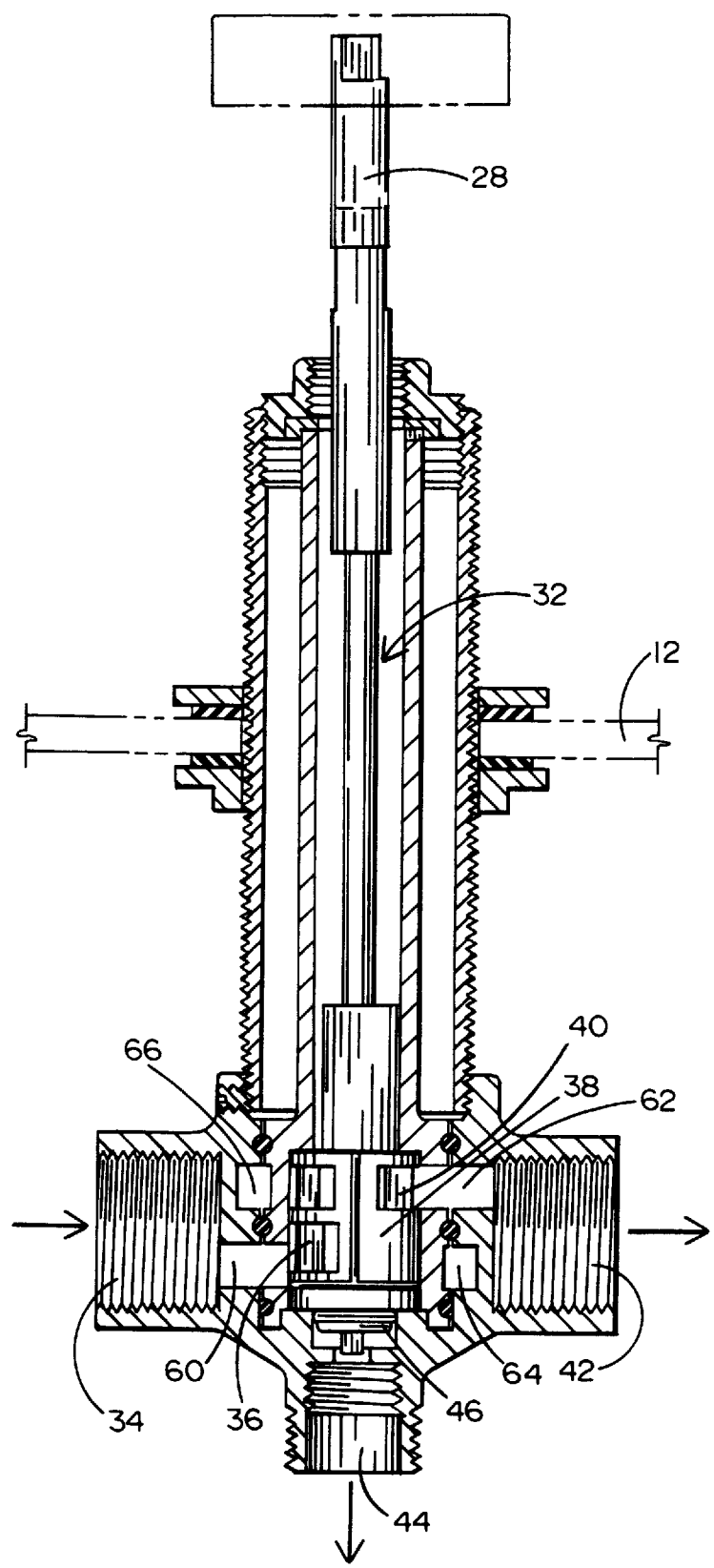
FIG. 4 is a vertical section through the diverter unit.
Figure 5:
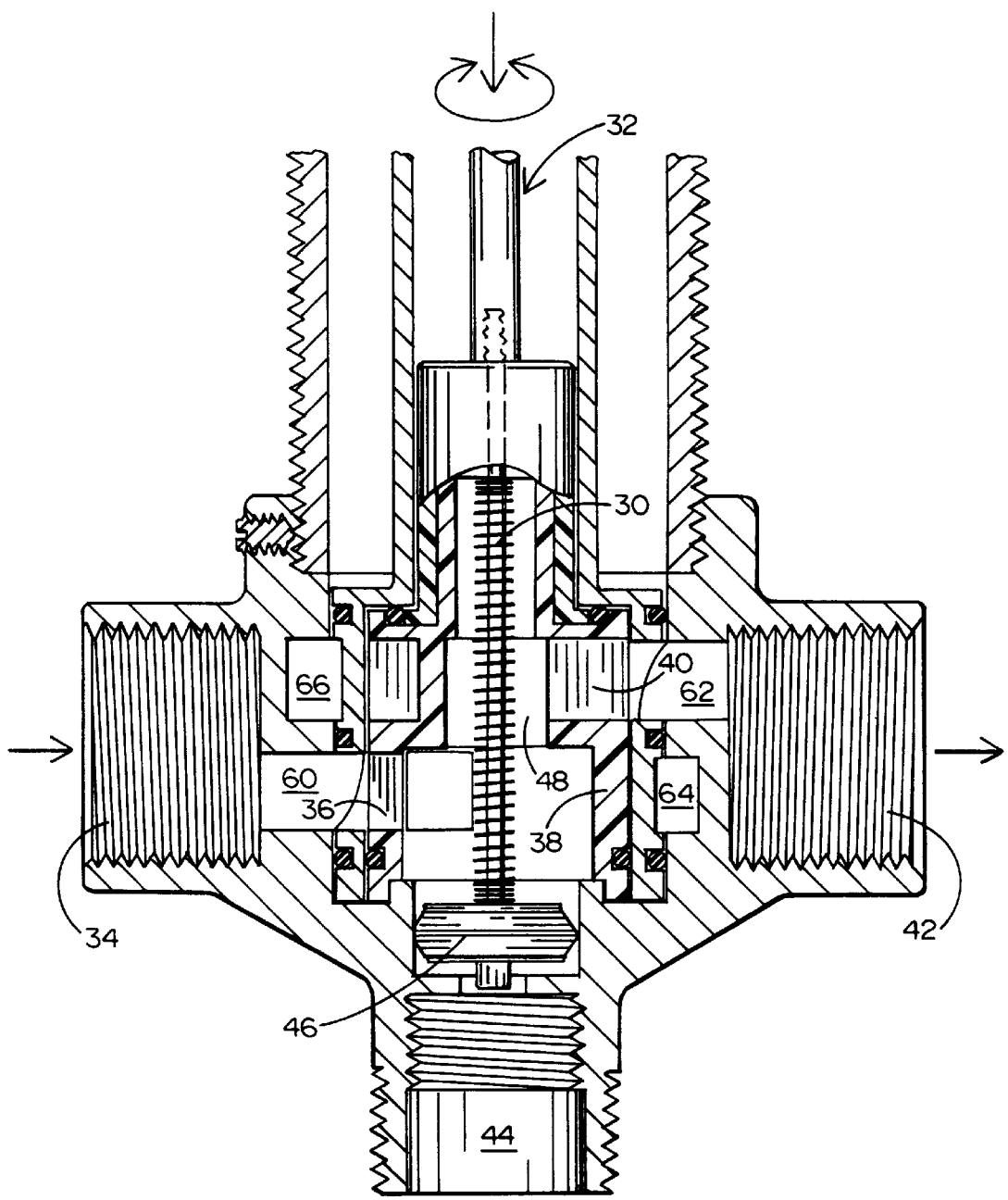
FIG. 5 is a fragmentary vertical section showing the diverter in the tub position.
Figure 6:
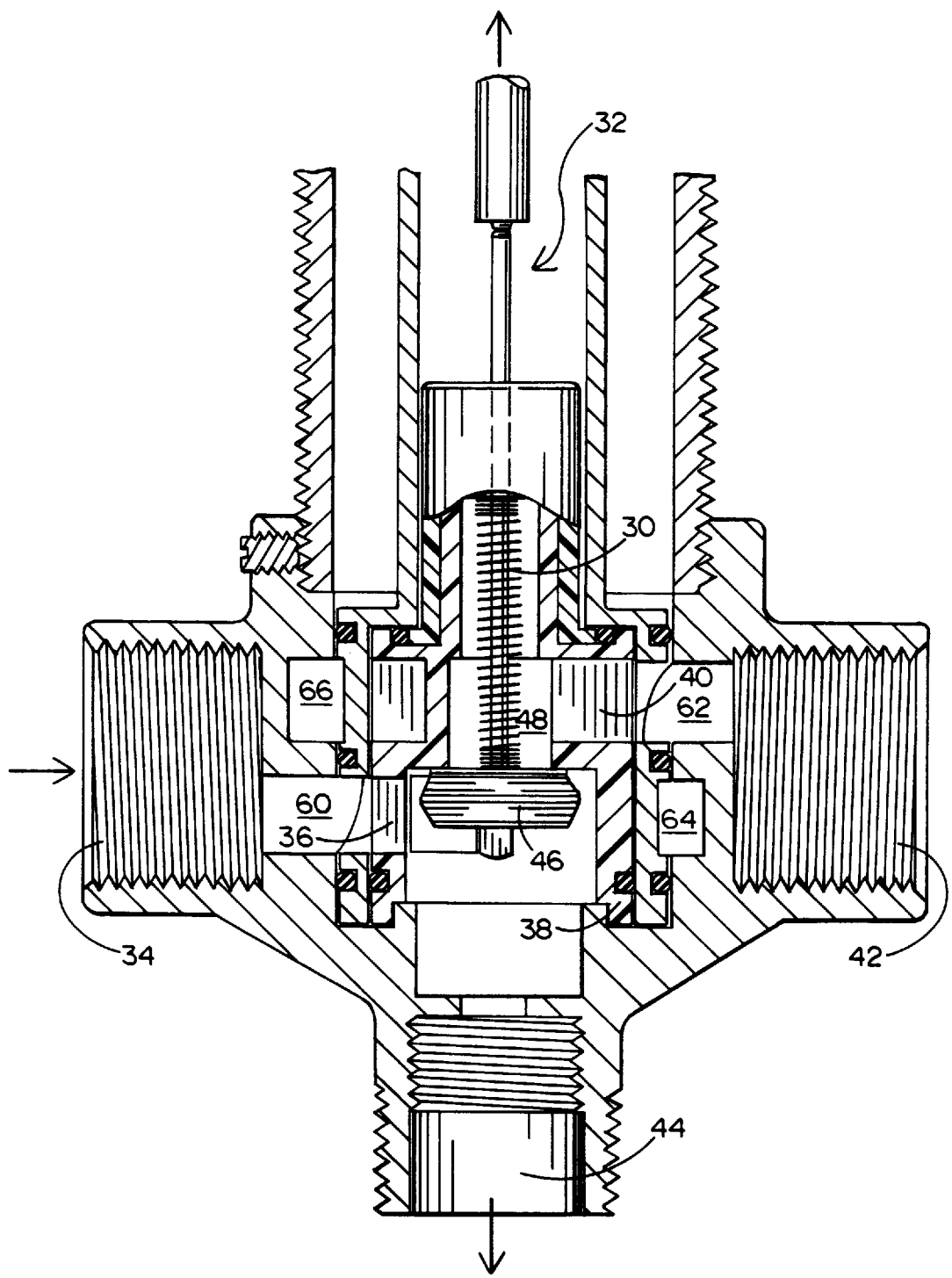
FIG. 6 is a fragmentary section showing the diverter in the shower position.

The inventive diverter 20 incorporates a positive vacuum breaker which is actuated by the spring 30 (FIGS. 3 and 5) as well as by the weight of the diverter handle and shaft assembly 32. Normally, in the down position of assembly 32 (FIG. 5), water flows from the water inlet 34 through openings 36 in the diverter cage 38, up through the interior of cage 38, and out through openings 40 into the outflow line 42 connected to the spigot 18. The shower outflow 44 is blocked at this time by the valve disc 46 which forms the lower end of the assembly 32. When use of the shower head 22 is desired, the assembly 32 is pulled up by the handle 28 (FIG. 6). The valve disc 46 is thereby pulled into its upper position where it blocks the passage 48 connecting the openings 36 and 40 on the diverter cage 38 but opens a path from openings 36 to the shower outflow 44.

The assembly 32 is biased downward by the combined effect of its own weight and of the spring 30. Consequently, in order for the assembly 32 to remain up, the water pressure in the water inlet 34 must be sufficient to overcome that downward biasing force; in other words, the faucets 14, 16 must be open enough to create a substantial back pressure in the water inlet 34. This back pressure is created by the shower head's inability to dispense water as fast as it is supplied by the water inlet 34.

If a vacuum or suction were to occur at the water inlet 34, or even if the water flow is only turned down to where the back pressure in inlet 34 becomes insufficient to overcome the bias of spring 30, the assembly 32 immediately descends and connects the inlet 34 to the spigot 18 rather than the shower head 22.

Another feature of the inventive diverter is its ability to continue functioning if its operative internal parts become circumferentially misaligned or are improperly installed.

Normally, in order for the openings 36 to be turned toward the inlet 34 and the openings 40 toward the outlet 42, the notch 50 of the inner barrel 52 must be aligned with the notch 54 of the outer barrel 56 when the diverter 20 is assembled. This causes the cage 38, which is held against rotation with respect to inner barrel 52 by ears 57, to be in the correct position. Although the nut 58 protects the relative alignments of the inner barrel 52 and the outer barrel 56, it is possible either by vibration or by installation error that the barrels 52 and 56 will become rotationally misaligned with respect to each other.

To avoid failure of the diverter when the windows 36 and 40 of the cage 38 are turned out of contact with the passages 60, 62, respectively, the lower end of inner barrel 52 is provided with annular channels 64, 66 which communicate with the windows 36, 40, respectively. The windows 36, 40 extend through both the wall of cage 38 and the wall of inner barrel 52.

In the event of misalignment of the windows 36, 40 with the passages 60, 62, water can still flow from passage 60 to window 36 through channel 64, and from window 40 to passage 62 through channel 66. Thus a rotational misalignment of barrels 52, 56 may perhaps reduce the flow capacity of the spigot 18 because the cross section of channels 64, 66 is smaller than the cross section of the corresponding windows, but the diverter will still allow a reasonable flow of water from the inlet 34 to the spigot outlet 42 when the assembly 32 is in the down position.

It is understood that the exemplary diverter valve with vacuum breaker described herein and shown in the drawings represents only a presently preferred embodiment of the invention. Indeed, various modifications and additions may be made to such embodiment without departing from the spirit and scope of the invention. Thus, other modifications and additions may be obvious to those skilled in the art and may be implemented to adapt the present invention for use in a variety of different applications.

I claim:

1. A vacuum-breaking diverter valve for Roman tubs comprising:

a) a water inlet:

b) a first water outlet for connection to a non-submersible spigot:

c) a second water outlet for connection to a submersible shower head, the cross-sectional area of said second water outlet being smaller than that of said first outlet;

d) a cage providing selectable paths from said inlet to said outlets;

e) a valve disc movable between two positions and arranged to block said first path in the first of said positions, and said second path in the second of said positions;

f) a handle for moving said valve disc between said positions;

g) biasing means for biasing said valve disc into said second position when the water pressure in said second path is less than a predetermined minimum;

h) said cage being rotatable and equipped with openings at separate levels alignable, respectively, with said inlet and said first outlet, and annular conduit means surrounding said cage to convey water between said openings and said inlet and first outlet if said openings are not aligned with said inlet and outlet.

* * * * *